United States Patent

Smith et al.

[15] 3,655,310
[45] Apr. 11, 1972

[54] MANUFACTURE OF HOSE PIPES

[72] Inventors: Brian Lawrence Smith, Hornby, near Lancaster; Rodger William Robertson, Halton-on-Lune, near Lancaster, both of England

[73] Assignee: George Angus & Company Limited, Newcastle-upon-Tyne, England

[22] Filed: June 30, 1969

[21] Appl. No.: 837,676

[30] Foreign Application Priority Data

Aug. 16, 1968 Great Britain ...................... 39,280/68

[52] U.S. Cl. ..................... 425/109, 226/112, 26/55, 425/112, 425/113, 425/155, 425/380
[51] Int. Cl. ............................................ B29f 3/10
[58] Field of Search ............... 226/112, 115, 118; 18/1 E, 18/12 TM, 12 TB, 13 H, 14 G, 14 I, 4 S; 26/55, 56; 118/34

[56] References Cited

UNITED STATES PATENTS

| | | | |
|---|---|---|---|
| 2,990,577 | 7/1961 | Kraffe de Laubarede | 18/14 |
| 2,389,556 | 11/1945 | Siegerist | 226/112 UX |
| 1,246,910 | 11/1917 | Gonzenbach | 26/55 |
| 3,191,230 | 6/1965 | Ashton | 18/13 |
| 2,126,453 | 8/1938 | Criley et al. | 226/112 UX |

Primary Examiner—Theron E. Condon
Assistant Examiner—Horace M. Culver
Attorney—Watson, Cole, Grindle & Watson

[57] ABSTRACT

The invention provides mechanism for feeding a textile jacket along a rearward extension of the mandrel of an extrusion head which applies to the jacket a cover and a lining of rubber or plastics material, said mechanism including two spaced clamps which are operable alternately to clamp the jacket to the mandrel extension and to hold the latter against forward movement, two feed mechanisms one of which operates while the front clamp is engaged to feed the portion of the jacket between the clamps forwardly along the mandrel extension, and the other of which operates while the rear clamp is engaged to feed forwardly along the mandrel extension the portion of the jacket in advance of the clamps and an automatic control circuit for effecting sequential operation of the clamps and the feed mechanisms.

5 Claims, 3 Drawing Figures

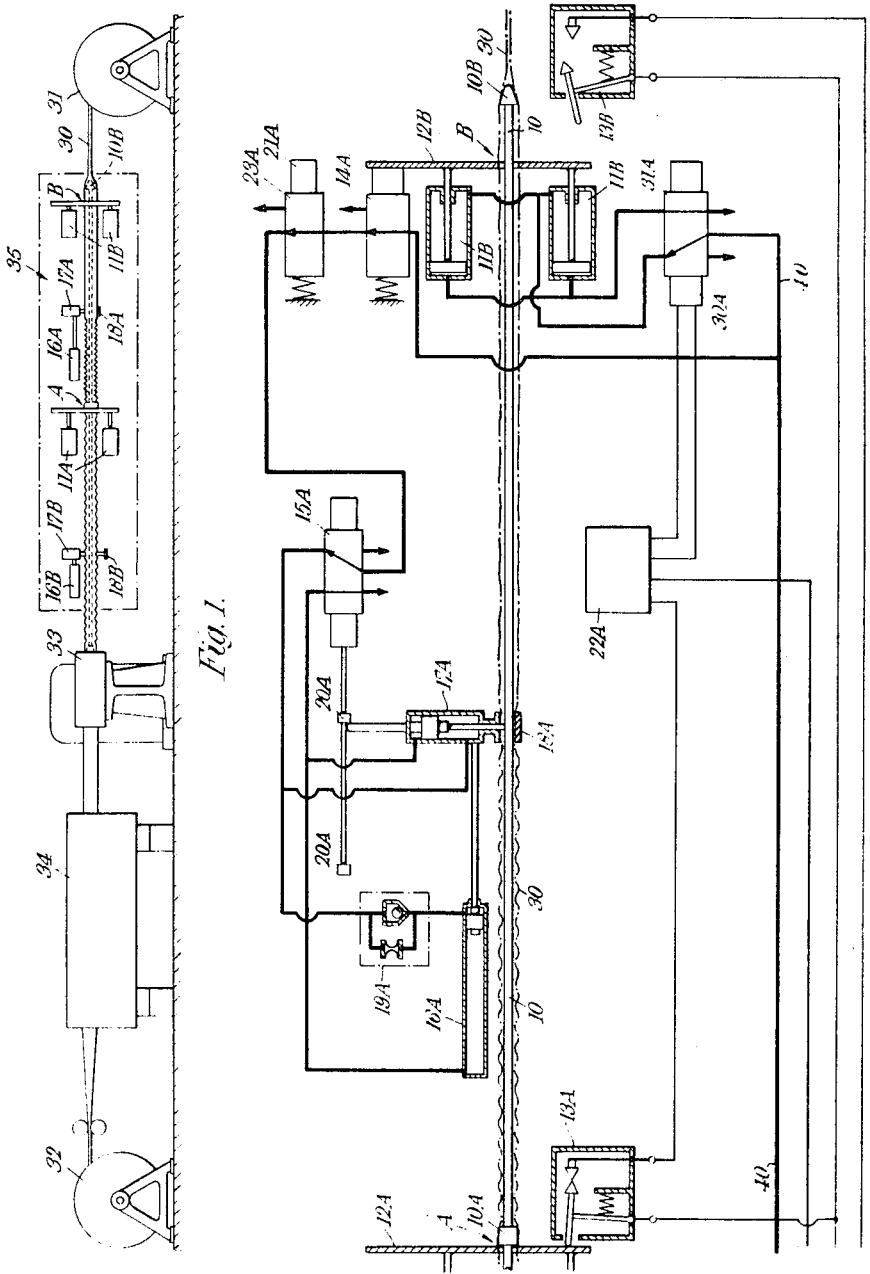

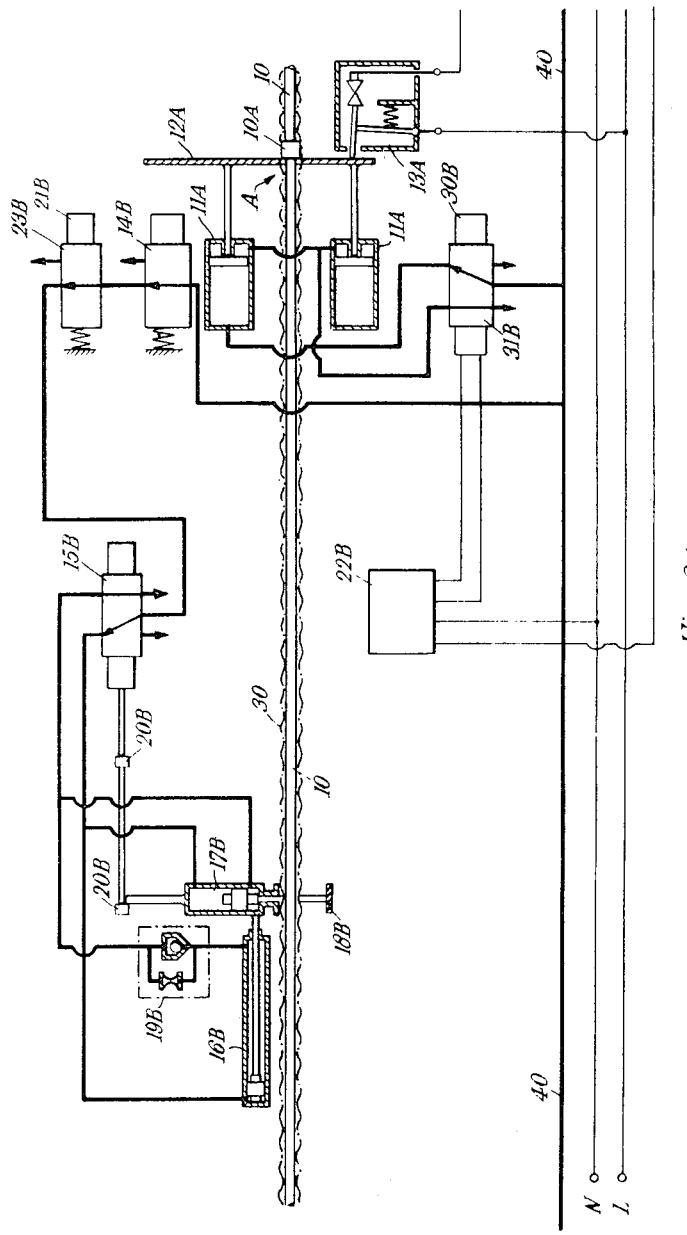

MANUFACTURE OF HOSE PIPES

This invention relates to apparatus for the manufacture of hose pipes, consisting of a tubular textile reinforcing jacket having an outer cover and an internal lining of rubber or plastics material of the type comprising an extrusion head containing a mandrel and which forms the cover and lining as the jacket is drawn through it, the mandrel having a rearward extension over which the jacket passes on its way to the extrusion head. An apparatus of this kind is described in U.S. Pat. No. 2,990,577.

The hose pipe is drawn off from the extrusion head by a suitable take-off mechanism such as a driven take-up drum and the present invention is concerned with the provision of improved mechanism for feeding the jacket along the mandrel extension towards the extrusion head and at the same time holding the mandrel firmly so that it will not move in the extrusion head.

The mechanism according to the invention includes two spaced clamps which are operable alternately to clamp the jacket to the mandrel extension and to hold the latter against forward movement, two feed mechanisms, one of which operates while the front clamp is engaged to feed the portion of the jacket between the clamps forwardly along the mandrel extension, and the other of which operates while the rear clamp is engaged to feed forwardly along the mandrel extension the portion of the jacket in advance of the clamps and an automatic control circuit for effecting sequential operation of the clamps and the feed mechanisms.

One embodiment of the invention will now be described in detail and by way of example with reference to the accompanying drawings, in which:

FIG. 1 is a diagram showing an apparatus in accordance with the invention for making a hose pipe lined and covered with rubber or plastics material and FIGS. 2A and 2B are a diagrammatic drawing showing the automatic jacket feeder and the associated electrical and pneumatic circuits.

As shown in FIG. 1, a woven textile jacket 30 is drawn from a reel 31 by a take-up drum 32 through an extrusion head 33 which provides the jacket with a lining and a cover of polyvinyl chloride or other suitable material as described in U.S. Pat. No. 2,990,577. On its way from the extrusion head 33 to the drum 32 the lined and covered hose passes through a cooling chamber 34.

On its way to the extrusion head 33 the jacket 30 is advanced in corrugated formation along an extension 10 of the mandrel of the extrusion head by an automatic feeding unit 35, indicated diagrammatically in FIG. 1 but shown in detail in FIGS. 2A and 2B.

As shown in FIGS. 2A and 2B, the mandrel extension 10 is constituted by a rod 10 provided with two stops 10A and 10B. The extrusion head 33 exerts a considerable pull on the mandrel rod 10 which supports the male die in the head. The jacket must be fed over the rod 10 and at the same time the rod must not move forward under the pull otherwise the male die in the extrusion head would not be in its correct position. Accordingly the pull on the rod 10 is resisted by clamps A and B which cooperate alternately with the stops 10A and 10B. Associated with each clamp is a jacket feed mechanism. These feed mechanisms are identical and corresponding parts of the feed mechanisms are denoted by the same reference numerals, the numerals designating parts of the feed mechanism which operates when the clamp A is engaged bearing the suffix A and the numerals designating the parts of the feed mechanism which operates when the clamp B is closed bearing the suffix B.

The clamp A includes a pair of air cylinders 11A, the piston rods of which are attached to a clamping ring 12A which cooperates with the stop 10A. The clamp B includes a pair of air cylinders 11B, the piston rods of which are attached to a clamping ring 12B which cooperates with the stop 10B.

When, as shown, the clamp A is engaged to trap the jacket between the ring 12A and the stop 10A, a micro switch 13A is closed to allow current to flow to a timer unit 22A. This timer unit immediately energizes a solenoid 30A to cause an associated valve 31A to pass air from a pressure line 40 to the cylinders 11B to open the clamp B, which is held open for the period set on the timer 22A. After elapse of this period, the solenoid 30A is de-energized and the valve 31A shifts to cause the cylinders 11B to close the clamp B. The time interval is variable and the interval selected depends on the jacket being used. Very stiff jackets require a short feeding period of 5–10 seconds whilst flexible jackets can be fed for 1–2 minutes. The more frequent intervals are only employed with very stiff jackets which cannot easily be corrugated on the rod 10. With more flexible jackets the clamp system can change over less frequently as far more jacket can be packed onto the rod 10 between the stops 10A and 10B.

When the clamp B opens, its ring 12B opens a valve 14A to pass air under pressure through a valve 23A to a slide valve 15A which controls the flow of air to the ends of an air cylinder 16A and of two air cylinders 17A, one only of which is illustrated.

This causes rubber covered blocks 18A attached to the piston rods of the cylinders 17A to rise sufficiently to lift the rod 10 by approximately one-eighth inch and the piston of the cylinder 16A to move to the left, carrying the cylinders 17A and the blocks 18A with it, to feed to the left the jacket on the portion of the rod 10 between the stop 10A and the clamp B. The piston in the cylinder 16A travels at a rate determined by a flow restrictor 19A and the piston rod of the valve 15A has stops 20A which are operated by the piston rod of one of the cylinders 17A to change over the valve 15A at the ends of the stroke of the piston rod of the cylinder 16A. Upon change over of the valve 15A when the piston rod reaches its left hand end position the Blocks 18A release the jacket and the piston rod of the cylinder 16A begins to move in the reverse direction.

At the termination of the timing interval the clamp B engages, trapping the jacket between its clamp ring 12B and the stop 10B to prevent the rod 10 from moving forward. When the clamp closes it operates a micro switch 13B to activate a timer 22B which controls the clamp A through the agency of a solenoid 30B and a valve 31B so that the clamp A opens and the cycle just described for clamp B is repeated at clamp A. During this cycle, and when the ring 12A has operated the valve 14B, the blocks 18B of the other feed mechanism engage the jacket and the piston rod of the cylinder 16B moves to the left to feed towards the extrusion head the portion of jacket in advance of the engaged clamp B.

The jacket should be fed between the clamps and from the clamp A to the extrusion head at just over twice the speed at which it is taken up by the take-up drum 32 in order to make up for the time the double feeding system takes. It does not, however, matter if the jacket is fed rather too quickly for the extrusion head. There is no need to adjust the flow restrictors 19A and 19B very accurately in an attempt to compensate for take-up speed. If too much jacket builds up in front of an oscillating device 16A or 16B the device stops as the cylinder is of small bore and cannot force too much jacket to be corrugated on the mandrel rod. The fact that it stops does not affect the time intervals. If too much jacket is fed between the clamps A and B after 1 minute run while the times are set to say 2 minutes, it is only the oscillating device which stops after 1 minute and at the end of the 2 minutes the normal change over to the other clamp takes place.

The valves 23A and 23B are operated by solenoids 21A, 21B controlled from the extruder control panel and are used to stop the feed mechanisms, by shutting off the air supply to the valves 15A, 15B during setting up of the extrusion head when clamping force but not feed is required.

By adjusting the time intervals so as to have short delays it is possible to feed the jacket forward with very little concertina formation which cannot be achieved by manual feeding of the jacket. This is important when the jacket is formed of continuous filament synthetic yarns because in this case severe distortion of the fabric tends to result in uneven distribution of the jacket within the body of the finished hose.

We claim:

1. Apparatus for applying rubber or plastics material to a tubular textile jacket comprising, in combination with an extrusion head, a rod external to the extrusion head and constituting an extension of a mandrel within said extrusion head, said rod affording support for a reserve of jacket disposed in corrugated formation about said rod, front and rear clamps, means for engaging said clamps alternately to clamp the jacket to said rod at respective forward and rearward locations and to hold the rod against forward movement towards said extrusion head and for opening each clamp in response to engagement of the other clamp, two feed mechanisms, means for operating one feed mechanism while the front clamp is engaged to cause said one feed mechanism to engage and feed the portion of the jacket rearward of the front clamp forwardly along said rod, means for operating the other feed mechanism while the rear clamp is engaged to cause said other feed mechanism to engage and feed forwardly along said rod, without overlapping movement of said feed mechanisms, the portion of the jacket in advance of the rear clamp, and an automatic control circuit for effecting sequential operation of said clamp opening and engaging means and of said feed mechanism operating means.

2. Apparatus as claimed in claim 1, in which said clamp opening and engaging means includes a switch and a timer associated with each clamp, each switch being actuated upon engagement of a clamp to cause its timer to open the other clamp immediately and close said other clamp again after a predetermined time interval.

3. Apparatus as claimed in claim 2, in which said clamp opening and engaging means includes, for each clamp, a fluid pressure cylinder for moving said clamp between its open and its engaged positions and a solenoid operated valve controlling said pressure cylinder, the solenoid associated with each clamp being responsive to the timer associated with the other clamp.

4. Apparatus as claimed in claim 1, in which each feed mechanism operating means includes a fluid pressure cylinder for applying a block to the jacket and another fluid pressure cylinder for advancing the block to feed the jacket along the rod and a control valve for the cylinders which is operated to render the feed mechanism effective on the jacket in response to opening of an associated one of the clamps.

5. Apparatus as claimed in claim 1, wherein said rod carries spaced stops which cooperate respectively with said clamps to hold said rod against forward movement.

* * * * *